United States Patent [19]

White

[11] 4,425,444

[45] Jan. 10, 1984

[54] POLYOLS FOR URETHANE-MODIFIED ISOCYANURATE FOAMS

[75] Inventor: Kenneth B. White, Chicago, Ill.

[73] Assignee: Akzona Incorporated, Asheville, N.C.

[21] Appl. No.: 476,184

[22] Filed: Mar. 17, 1983

[51] Int. Cl.³ .............................................. C08G 18/14
[52] U.S. Cl. ..................................... 521/105; 521/167
[58] Field of Search ................................. 521/105, 167

[56] References Cited

U.S. PATENT DOCUMENTS

| | | | |
|---|---|---|---|
| 4,040,992 | 8/1977 | Bechara et al. | 521/117 |
| 4,151,334 | 4/1979 | Kan et al. | 521/105 |
| 4,186,255 | 1/1980 | Klein et al. | 521/128 |
| 4,256,802 | 3/1981 | Koehler et al. | 521/118 |

*Primary Examiner*—Maurice J. Welsh
*Attorney, Agent, or Firm*—Francis W. Young; Daniel N. Christus

[57] ABSTRACT

A method for the manufacture of urethane-modified polyisocyanurate foams in which an isocyanate is blended with a "B" side comprising a polyol blend, a surfactant, a blowing agent, and a catalyst. The polyol blend comprises at least 5% (wt.) of a mixture of a polyalkoxylated amine and a polyalkoxylated quaternary ammonium borate ester, at least 40% (wt.) of a resin polyol, with any remainder being a polyether or polyester polyol. All components of the "B" side will remain a homogeneous liquid without phase separation and without the need for agitation for at least 7 days after blending. The resin polyols are preferably moderate viscosity, aromatic polyester polyols derived from polycarbomethoxyl-substituted diphenyls, polyphenyls, and benzyl esters of the toluate family.

12 Claims, No Drawings

POLYOLS FOR URETHANE-MODIFIED ISOCYANURATE FOAMS

BACKGROUND OF THE INVENTION

This invention pertains to the formation of urethane-modified isocyanurate foams using mixtures of polyalkoxylated amines and polyalkoxylated quaternary ammonium borate esters as copolyols. More particularly this invention relates to the use of such copolyols to form foams having NCO/OH ratios of 1.5 to 3.5, using very inexpensive, commercially available resin polyols. A blend of these polyalkoxylated amines and polyalkoxylated quaternary ammonium borate esters with the aforesaid resin polyol and, optionally, a polyether or polyester polyol is very stable and will remain a homogeneous liquid without phase separation and without the need for agitation for at least 7 days after blending.

Urethane and polyisocyanurate foams are manufactured using a blend of an isocyanate and a polyol. The molar ratio of isocyanate to polyol, that is, the ratio of NCO functional groups to OH functional groups, is known as the "index" or "NCO/OH ratio". Foams are manufactured with both isocyanates and polyols and when the molar ratio of isocyanate to polyol is between 1.05 to 1.15, a urethane foam is formed according to the reaction:

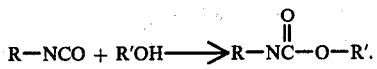

The urethane product shown above is the monomeric structural unit that combines to form the polyurethane foam. At an index between 1.5 and 3.5, a urethane-modified isocyanurate foam is formed. At indices above 4.1, a isocyanurate foam is formed having the monomeric unit:

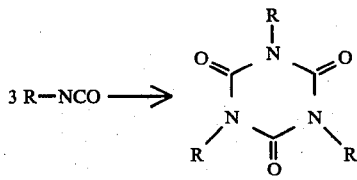

which may have a minority of urethane linkages. Herein, the terms isocyanurate and polyisocyanurate and the terms urethane and polyurethane in reference to foams will be used interchangably.

Currently, urethane-modified polyisocyanurate foams are manufactured using polyether or polyester polyols, as for example the Voranol ® group of polyols available from Dow Chemical Company, Midland, Mich. When combined with a catalyst, a surfactant, and a blowing agent, and then with an isocyanate in the known manner, these polyether or polyester polyols form a foam having good qualities. Certain resin polyols, such as the Terate ® resin polyol available from Hercules, Incorporated, Wilmington, Del. are of a hydroxyl number sufficient so as to theoretically permit their use in foam manufacture. In practice, however, these polyols have proved to be unacceptable at concentrations in excess of 40% (wt.) of the total polyol blend for use in manufacturing high quality urethane-modified polyisocyanurate foams. Because the resin polyols are about one-third less costly than the currently used conventional polyether or polyester polyols, it is desirable that a polyol blend be found that may be used with larger quantities of such resin polyols to result in a polyisocyanurate foam having acceptable properties and at a lower cost.

SUMMARY OF THE INVENTION

The present invention is a method for the manufacture of urethane-modified polyisocyanurate foams, comprising blending an isocyanate with a "B" side, the "B" side comprising a polyol blend, a surfactant, a blowing agent, and a catalyst. The polyol blend comprises: at least 5% (wt.) of a mixture of a polyalkoxylated amine and a polyalkoxylated quaternary ammonium borate ester, the weight ratio of the polyalkoxylated amine to the polyalkoxylated quaternary ammonium borate ester being between 1:0.15 and 1:12.0; at least 40% (wt.) of a resin polyol, the resin polyol comprising at least 70% (wt.) of a combination of polymers and monomers having the general formula:

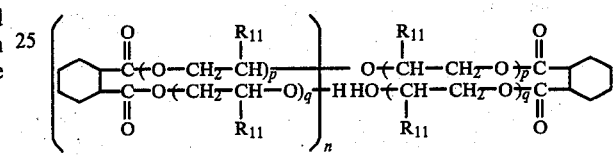

wherein n is between 0 and 50, $R_{11}$ is either H— or $CH_3$—, and p and q are integers each having a value of between 1 and 10; and the remainder of the polyol blend being a polyether or polyester polyol. All of the components of the "B" side may be blended and will thereafter remain a homogeneous liquid without phase separation and without the need for agitation for at least seven days.

In another embodiment of the invention, the polyalkoxylated amine is selected from the group consisting of:

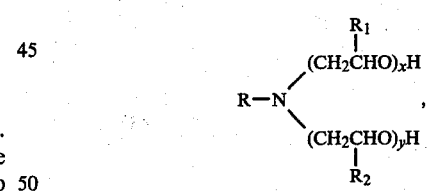

wherein R is selected from the group of alkyl radicals having between 1 and 18 carbon atoms, x and y are integers each having a value of at least one and wherein the sum of x and y does not exceed 50 and wherein $R_1$ and $R_2$ may be the same or different and may be selected from the groups consisting of H—, $CH_3$—, $C_1$-$C_{10}$ straight- or branched-chain alkyl or alkenyl radicals, a phenyl group, a benzyl group or halogenated alkyl group. In a most preferred polyalkoxylated amine, R corresponds to the tallow alkyl group, $R_1$ and $R_2$ are each H—, and x plus y equal 5. Hence, the preferred polyalkoxylated amine is a tallow penta-ethyoxylated amine.

In a still further embodiment of the invention, the polyalkoxylated quaternary ammonium borate esters are of the general formula:

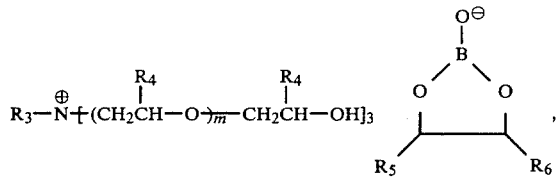

wherein $R_3$ is a straight- or branched-chain alkyl or alkenyl radical having from 1 to 30 carbon atoms, inclusive, or a phenyl or benzyl radical; $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group; and wherein m is an integer between 0 to to 30, inclusive. Preferably, the polyalkoxylated quaternary ammonium borate ester will include an $R_3$ that is a straight- or branched-chain alkyl or alkenyl radical having from 8 to 18 carbon atoms, and $R_4$, $R_5$, $R_6$ will be H—. The borate ester anion may alternatively include a $CH_3$— at the $R_6$ position. A most preferred quaternary ammonium borate ester has an m equal to 0 and an $R_3$ corresponding to the tallowalkyl ($C_{18}H_{37}$) radical.

In yet another embodiment of the present invention, the polyalkoxylated amine is selected from the group consisting of:

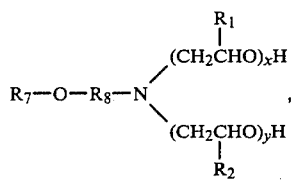

wherein $R_7$ is selected from the group of $C_1$–$C_{20}$ alkyl groups and $R_8$ is a $C_2$ to $C_5$ alkyl group; $R_1$ and $R_2$ are the same or different and may be selected from the groups consisting of H—, $CH_3$—, $C_1$ to $C_{10}$ straight- or branched-chain alkyl or alkenyl radicals, a phenyl group, a benzyl group, or a halogenated alkyl group; and x and y are integers each having a value of at least 1 and having a sum not exceeding 50.

An object of the present invention is a method for the manufacture of urethane-modified polyisocyanurate and polyisocyanate foams in which the polyol blend, surfactant, blowing agent, and catalyst remain a homogeneous liquid without phase separation and without the need for agitation for at least seven days. A further object of the invention is a method for the manufacture of urethane-modified polyisocyanurate foams in which at least 40% and preferably in excess of 65% by weight of the polyol blend comprises a resin polyol so as to reduce the cost of manufacturing those foams by decreasing the amount of relatively expensive conventional polyether or polyester polyol used in the polyol blend.

DESCRIPTION OF THE PREFERRED EMBODIMENTS

The isocyanates may be selected from the groups including the organic polyisocyanates which are disclosed herein as useful in the production of conventionally manufactured polyisocyanurate foams. A preferred polyisocyanate is Mondur ®MR, a polycyclic aromatic polyisocyanate available from the Mobay Chemical Corporation, Pittsburgh, Pa.

Present polyisocyanurate foams may be manufactured according to methods known in the art. These methods comprise blending two components, stirring, and allowing the blend to rise in an open container so as to form the desired foam. The two components are known as the "A" and "B" components, with the "A" component comprising the isocyanate and the "B" component comprising a blend of polyol, catalyst, surfactant, and blowing agent.

Catalysts may be selected from those conventionally used in the art, including metal salts, alkali metal salts, and tertiary amine trimerization catalysts. A preferred catalyst is potassium octonoate or potassium 2-ethylhexanoate. The present preferred catalyst is M & T-T45 catalyst, which is 45% active potassium 2-ethylhexanoate and 55% polyethylene glycol having a molecular weight of 200, and which is available from M & T Chemicals Inc., Rahway, N.J., 07065. The amount of catalyst to be used will range from 0.01% to 2% of the total polyol blend weight. The blowing agent may be selected from the group including water, methylene chloride, or any of the fluorocarbons known to those skilled in the art which can be used for blowing polymer mixtures into cellular polymers. Generally speaking, such fluorocarbon blowing agents are fluorinated aliphatic hydrocarbons which may also be substituted by chlorine and/or bromine. A most preferred blowing agent is Freon ® 11A, a trifluorochloromethane produced by E. I. DuPont de Nemours & Company, Wilmington, Del. Surfactants may likewise be chosen from among those known to the skilled in the art; a preferred surfactant is DC-193, a surfactant having silicon glycol copolymers with a direct silicon-carbon bonds, and sold by the Dow Corning Corporation, Midland, Mich.

The present polyol blends may be obtained by mixing in a container the polyalkoxylated amine, polyalkoxylated quaternary ammonium borate ester, resin polyol, and optionally, the polyether or polyester polyol. The polyalkoxylated amines may include polyethoxylated or polypropoxylated amines, wherein the amines are tertiary amines having one fatty alkyl group derived from various fatty sources and two or more polyoxyethylene or polyoxypropylene groups attached to the nitrogen. Typical of these polyethoxylated or polypropoxylated amines are the Ethomeen ® polyethoxylated amines available from the Armak Company, 300 S. Wacker Drive, Chicago, Ill., 60606, preferably being of the general formula:

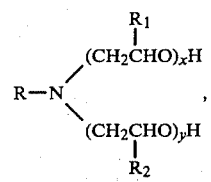

wherein R is selected from the group of alkyl radicals having between 1 and 18 carbon atoms, x and y are integers each having a value of one or more, the sum of x and y not exceeding 50; and wherein $R_1$ and $R_2$ may be the same or different, and may be selected from the groups consisting of H—, $CH_3$—, $C_1$–$C_{10}$ straight- or branched-chain alkyl or alkenyl radicals, a phenyl group, a benzyl group or halogenated alkyl group. Another preferred polyalkoxylated amine includes the compound Ethomeen®EA-80 polyethoxylated ether amine, which is manufactured by the combination of a $C_8$ and $C_{10}$ branched-chain alcohol and which is also available from the Armak Company, Chicago, Ill. These preferred ether amines are selected from the group consisting of:

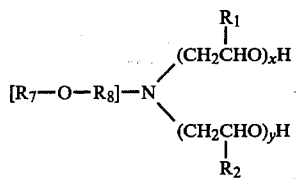

wherein $R_7$ is selected from the group of $C_1$–$C_{20}$ alkyl groups, and $R_8$ is a $C_2$ to $C_5$ alkyl group; $R_1$ and $R_2$ are the same or different and may be selected from the groups consisting of H—, $CH_3$—, $C_1$ to $C_{10}$ straight- or branched-chain alkyl or alkenyl radicals, a phenyl group, a benzyl group, or a halogenated alkyl group; and x and y are integers each having a value of at least 1 and having a sum not exceeding 50.

Also required for the polyol blend are polyalkoxylated quaternary ammonium borate esters. These compounds are of the general formula:

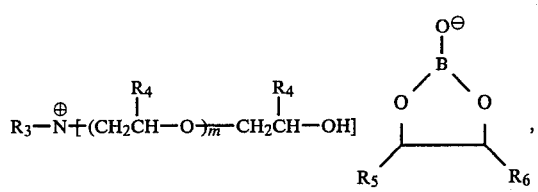

wherein $R_3$ is a straight- or branched-chain alkyl or alkenyl radical having from 1 to 30 carbon atoms, inclusive, or a phenyl or benzyl radical; $R_4$ is H—, a $C_1$ to $C_{10}$ straight- or branched-chain alkyl or alkenyl radical, a phenyl group, a benzyl group, or a halogenated alkyl group; $R_5$ and $R_6$ are different or the same and are selected from the group including H—, or a $C_1$ to $C_{10}$ straight- or branched-chain alkyl or alkenyl radical, a phenyl group, or a benzyl group, and wherein m is an integer between 0 and 30, inclusive. The cationic portion of the polyalkoxylated quaternary ammonium borate ester may also be selected from the group described by the general formula:

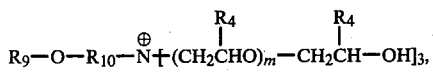

wherein m and $R_4$ are as defined hereinabove, $R_9$ is a $C_1$–$C_{20}$ alkyl or alkoxy group, and $R_{10}$ is a $C_2$ to $C_5$ alkyl group. Preferably, $R_{10}$ is —$C_3H_6$— and $R_9$ is a combination of approximately equal amounts of $C_{12}$–$C_{15}$ alkyl groups. In this specification, the cationic portion of the polyalkoxylated quaternary ammonium borate esters may be selected from either of the above two general formulae. The weight ratio of the polyalkoxylated amine to the polyalkoxylated quaternary ammonium borate ester is between 1:0.15 and 1:12.0.

At least 40% by weight of the polyol blend will comprise a resin polyol, and at least 70% by weight of this resin polyol will be a combination of polymers and monomers having the general formula:

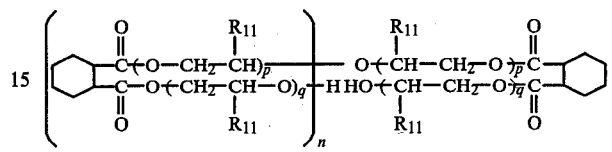

wherein n is between 0 and 50, $R_{11}$ is either H— or $CH_3$—, and p and q are integers each having a value of between 1 and 10. The "ortho-" form of the present combination of polymers and monomers is shown in the above general formula. It will be understood by those skilled in the art that the "para-" form of this combination may also be used. The monomeric form of the above compounds is that form wherein n is equal to 0, and the polymeric form of the above compounds is that form wherein n is between 1 and 50, inclusive. Examples of the above resin polyols include the Terate ®200 series resin polyols for rigid and semi-rigid polyurethane foam described in Bulletin OR-255 of Hercules, Inc., Wilmington, Del. 19899, and the above formula (I) is believed to be an accurate structural representation of about 70% of the weight of the Terate ® resin polyols. The Terate ® resin polyols are general purpose, moderate viscosity, aromatic polyester polyols derived from polycarbomethoxy-substituted diphenyls, polyphenyls, and benzyl esters of the toluate family. The Terate ® polyols are dark colored, highly polar liquids that are insoluble in aliphatic hydrocarbon solvents and water. Product grades and typical properties are as follows:

TABLE 1

| Product Grade | Viscosity at 25° C., cps | Hydroxyl Number | Acid Number as Carboxylic Acid | Water, Percent | Average Equivalent Weight |
|---|---|---|---|---|---|
| Terate ® 202 | 1,900 | 440 | 4.5 | 0.1 | 127.5 |
| Terate ® 203 | 19,000 | 315 | 5.1 | 0.1 | 178 |
| Terate ® 204 | 13,000$^{(a)}$ | 275 | 6 | 0.1 | 204 |
| Terate ® 211 | 18,000 | 540 | 3 | 0.1 | 104 |
| Terate ® 213 | 30,000 | 315 | 3 | 0.1 | 178 |

$^{(a)}$at 40° C.

A most preferred Terate ® resin polyol for use in the present invention is Terate ®203 resin polyol.

The remainder of the polyol blend, if the total polyol blend will not be limited to the polyalkoxylated amine, polyalkoxylated quaternary ammonium borate ester, and resin polyol, will be a conventional polyether or polyester polyol. These polyether or polyester polyols are well known in the art of polyurethane and polyisocyanurate foam manufacture, as for example the Voranol ® polyether polyols manufactured by the Dow Chemical Company, Midland, Mich. A most preferred polyether or polyester polyol is Voranol ®575.

The particular polyol blend in accordance with this invention is advantageous in that all of the components of the "B" side may be blended together with a polyol blend and the "B" side will thereafter remain a homogeneous liquid without phase separation and without the need for agitation for at least 7 days, and may still be used to manufacture a foam having excellent physical properties.

There are several criteria to be noted in determining whether a foam is of an acceptable quality. Of lesser importance is the tack free time, which is preferably about 60 seconds or less. Dimensional stability is more important, and the foam should not exceed 115% of its original dimensions after seven days. Dimensional stability is tested at two conditions: 158° F. and 100% relative humidity; and 200° F. and ambient humidity. Another important criterion is the percentage of closed cells in the foam itself, with a minimum of 85% required. Finally, a percent friability, the loss of weight of the polyisocyanurate foam due to crumbling, is determined by the ASTM C421 test. The friability of a foam is good if under 20% and excellent if under 10%.

The following examples will demonstrate the use of the present polyol blend in the manufacture of polyisocyanurate foams using low cost resin polyols. The first four examples pertain to the manufacture of the particular mixture of a polyalkoxylated amine and a polyalkoxylated quaternary ammonium borate ester. These mixtures are used in this invention in an amount comprising at least 5% (wt.) of the polyol blend.

EXAMPLE 1

304 grams of 1,2-propanediol (4.0 gram moles) are added to 124 grams of boric acid (2.0 gram moles) in a one-liter, three neck flask equipped with a heating mantle, a Dean-Stark trap, and a condenser. The mixture is heated to 128° C. at atmospheric pressure, and retained at that temperature and pressure for about 3½ hours, during which time about 44.5 grams of water was stripped from the mixture. A water aspirator is then started to create a slight vacuum at the condenser, and another 65.0 grams of water is stripped from the mixture during the next 5¾ hours. The total water removed (109.5 grams) corresponds to the stoichiometric amount, but analysis of the borate ester adduct remaining in the flask showed that it contained 3.4% water.

40 grams (0.25 gram moles) of the borate ester formed are added to 262 grams (1.0 gram mole) of Armeen ®TM 97 aliphatic amine, so as to obtain a 1:0.25 ratio of amine to borate ester, and 58.1 grams diethylene glycol, a solvent. After heating the reaction mixture to 75° C., 121.0 grams (2.75 gram moles) of ethylene oxide are added thereto over the next 2½ hours. Analysis of the resulting mixture showed a blend containing 45.4% free amine and 36.7% of a quaternary ammonium propylene glycol borate ester having the formula:

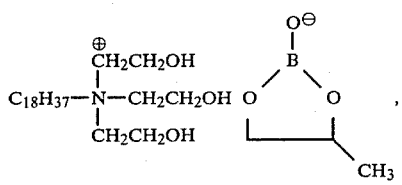

This formula corresponds to Armol TM 101B-3 polyethoxylated amine/ammonium borate ester blend.

EXAMPLE 2

A 100 gallon Monel reactor was charged with 186 lbs. (0.71 lb. mole) of Armeen ®TM 97 aliphatic amine and 30.0 lbs. of diethylene glycol, and the mixture was heated to 65° C. Over a two hour period, 85 lbs. (0.53 lb. mole) of the bis-propylene glycol borate ester described in Example 1 was pumped into the reactor, causing the temperature to rise to 80° C. After cooling to 75° C., 133 lbs. (3.02 lb. mole) of ethylene oxide was added over a period of two hours and 42 minutes. During this time the total reactor pressure was not allowed to exceed 50 psig and the temperature was maintained at 95° C. The mixture was allowed to digest for another 2 hours and 40 minutes, where upon analysis showed 1.317 meg/g of quat and 0.307 meg/g of free amine and 0.3% $H_2O$. The reactor was purged with a stream of nitrogen at 75°-85° C. and 0 psig pressure for 4 hours and an additional 6 hours at 100° C. Analysis showed 0.11% $H_2O$. This is Armol TM 101B-1.

27.9 lbs. of the 101B-1 and 107.1 lbs. Ethomeen ®T/15 were mixed in a 30 gallon Pfaudler reactor at 70° C. Water was removed from the blend by sparging with a stream of nitrogen at 70° C. at 27" Hg vacuum over a 5½ hour period. Analysis after this time showed; quat 0.238 meg/g, free amines 1.779 meg/g, pH (10% in $H_2O$) 10.9, $H_2O$ < 0.1% and OH value 318. This product corresponds to Armol TM 201B-125 amine/ammonium borate ester blend.

EXAMPLE 3

39.0 lbs. of Armol TM 101B-1 amine/ammonium borate ester blend and 96.0 lbs. of Ethomeen ®T/15 ethoxylated amines was blended at 70° C. in a 30 gallon Pfaudler reactor. Water was removed by sparging with a stream of nitrogen at 70° C. 27" Hg vacuum over 5 hours. Analysis showed; quat 0.331 meg/g, free amine 1.650 meg/g, pH (10% in water) 10.9, $H_2O$ < 0.1%, OH value 332. This product corresponds to Armol TM 201B-135 amine/ammonium borate ester blend.

Armol TM 201B-145, Armol TM 201B-155 and Armol TM 201B-175 amine/ammonium borate ester blend are manufactured in the manner described above using Armol TM 101B-1: Ethomeen ®T/15 ratios of 4.8:8.2, 5.9:7.1, and 9.3:5.7, respectively.

EXAMPLE 4

304 grams of 1,2-propane diol (4.0 gram moles) are added to 124 grams of boric acid (2.0 gram moles) in a one-liter, three neck flask equipped with a heating mantle, a Dean Stark trap, and a condenser. The mixture is heated to 128° C. at atmospheric pressure, and retained there for about 3½ hours, during which time about 44.5 grams of water are stripped from the mixture. A water aspirator is then started so as to create a slight vacuum at the condenser, and another 65.0 grams of water is stripped from the mixture during the next 5¾ hours. The total water removed of 109.5 grams corresponds to the stoichiometric amount, but analysis of the adduct remaining in the flask showed that it contained 3.4% water.

160 grams (1.0 gram mole) of this propylene glycol borate ester are added to 262 grams (1.0 gram mole) of Armeen ®TMD aliphatic amine and 134 grams (1.0 gram mole) of dipropylene glycol, a solvent. The reactor in which these reactants are blended is communicative with an ethylene oxide reservoir through a stainless steel tube. Four moles of ethylene oxide, pressurized in its reservoir by nitrogen, are slowly added to the reactor over the next 8½ hours, and the resulting quaternary is represented by the formula:

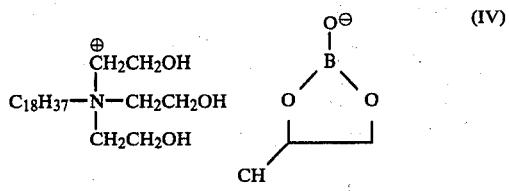

(IV)

The product formed in the above ethoxylation comprises 48.6% of the ethoxylated quaternary ammonium borate ester shown above and 10.3% free amine, and corresponds to Armol TM 101B-4 amine/quaternary ammonium borate ester.

Armol TM 101B-2 quaternary ammonium borate ester may be manufactured by adding 75 grams (0.469 gram moles) of the propylene glycol borate ester described in the first paragraph of this example to 246 grams (0.939 gram moles) Armeen ®TM-97, and 35 grams of diethylene glycol, and then ethoxylating this blend with 144 grams (4.0 gram moles) of ethylene oxide in the manner described in the second paragraph of this example.

The ratios of free amine to quaternary in the presently used amine/quaternary ammonium borate ester blend are as follows:

| Amine/quaternary ammonium borate ester blend | | Ratio, free amines: quat |
|---|---|---|
| Armol TM | 101B-1 | 1:4.06 |
| | 101B-2 | 1:1.51 |
| | 101B-3 | 1:0.54 |
| | 101B-4 | 1:11.6 |
| Armol TM | 201B-125 | 1:0.156 |
| | 201B-135 | 1:0.234 |
| | 201B-145 | 1:0.357 |
| | 201B-155 | 1:0.490 |
| | 201B-175 | 1:0.861 |

EXAMPLE 5 (B-152)

A urethane-modified polyisocyanurate foam was manufactured by blending 170.3 grams of Mondur MR with a "B" side comprising 20 grams of Armol TM 201B-125, 67.5 grams Terate ®203, 12.5 grams Voranol ®575, 2.5 grams Dow Corning DC-193, and 41 grams Freon ®11A. The resulting foam had a cream time of 24 seconds, a gel time of 46 seconds, a tack free time of 69 seconds, a density of 2.08 lbs. per cubic foot, a 1.21% friability, 88.3% closed cells, was at 109.41% of its original dimensions after seven days at 158° F. and 100% relative humidity, and was at 106.81% of its original dimensions after seven days at 200° F. and the ambient relative humidity.

EXAMPLES 6-9

Urethane-modified diisocyanurate foams were manufactured in substantially the same manner set forth in Example 5, except that instead of Armol TM 201B-125, other amine/quaternary ammonium borate ester blends were used in accordance with the data in Table 2 below. The reaction profile, densities, percent closed cells, and percent friability are also shown in Table 2.

EXAMPLE 10 & 11

Urethane-modified polyisocyanurate foams were prepared by blending 20 grams of a amine/ammonium borate ester blend with Terate ®203. The particular amine/quaternary ammonium borate ester blend used and the reaction profiles and physical properties of the foams manufactured are disclosed in Table 3 below.

EXAMPLES 12-14

In the following examples, the "B" side, comprising the polyol blend, a surfactant, a blowing agent, and a catalyst were blended and allowed to stand without agitation for seven days. At the end of the seven days, the blends were observed to determine whether they had remained homogeneous. Non-homogeneity, or phase separation of the "B" sides, which were stored in a sealed one-pint jar on a shelf, could be easily determined by viewing the blend. Upon phase separation, the "B" side would be seen to contain separate and distinct layers. The results are listed in Table 4; those samples showing homogeneity are indicated by the word "yes" in the row entitled "One Week Stability".

EXAMPLE 15

This example is substantially similar to Examples 12–14, except that here the "B" side contain no polyester or polyether polyol and no catalyst. Instead, the "B" side contain 20 grams of Armol TM 201B-125 and 80 grams of Terate ®203 as the polyol blend, and 38.5 grams of Freon ®11A. The blend remained in a stable and homogeneous form for seven days without agitation.

EXAMPLES 16 & 17

Urethane-modified polyisocyanurate foams were manufactured in substantially the same manner as set forth in Example 5, except that instead of Armol TM 201B-125, Armol TM 101B-1 and Armol TM 201B-135 were used in accordance with the data in Table 5 below. The reaction profile, densities, percent closed cells and percent friability are also shown in Table 5. The "B" sides used in the manufacture of Examples 16 and 17, like the "B" sides used in the manufacture of all of the previous foams in Examples 5–15, pass the seven day stability test.

TABLE 2

| | Example 6 (B-157) | Example 7 (B-158) | Example 8 (B-159) | Example 9 (B-153) |
|---|---|---|---|---|
| Armol 201B-135 | 17.5 | — | — | — |
| Armol 201B-145 | — | 15 | — | — |
| Armol 201B-155 | — | — | 15.0 | — |
| Armol 201B-175 | — | — | — | 15 |
| Terate 203 | 67.5 | 67.5 | 67.5 | 67.5 |
| Voranol 575 | 15 | 17.5 | 17.5 | 17.5 |
| DC-193 | 2.5 | 2.5 | 2.5 | 2.5 |
| Freon 11A | 42 | 43 | 43 | 41.5 |
| Mondur MR | 175.2 | 180.6 | 182.6 | 186.6 |
| NCO/OH Ratio | 2.0 | 2.0 | 2.0 | 2.0 |
| Reaction Profile (Min:Sec) | | | | |

TABLE 2-continued

| | | Example 6 (B-157) | Example 7 (B-158) | Example 8 (B-159) | Example 9 (B-153) |
|---|---|---|---|---|---|
| Cream Time | | 0:25 | 0:29 | 0:27 | 0:19 |
| Gel Time | | 0:43 | 0:49 | 0:43 | 0:29 |
| Tack Free Time | | 1:03 | 1:18 | 0:58 | 0:33 |
| Density (PCF) | | 1.99 | 2.00 | 2.02 | 2.02 |
| Humid Aging, 158° F./100% RH, | 1 day | 5.73 | 8.25 | 5.66 | 6.30 |
| % change in volume | 7 days | 7.06 | 10.05 | 6.70 | 6.71 |
| Dry Aging, 200° F./ambient RH, | 1 day | 1.69 | 1.71 | 0.72 | 1.89 |
| % change in volume | 7 days | 3.39 | 3.50 | 2.01 | 3.23 |
| % Closed Cells | | 93.3 | 90.4 | 90.9 | 92.8 |
| % Friability | | 0.9 | 1.95 | 0.62 | 0 |

TABLE 3

| | Example 10 (B-154) | Example 11 (B-160) |
|---|---|---|
| Armol 201B-125 | 20 | — |
| Armol 201B-135 | — | 20 |
| Terate 203 | 80 | 80 |
| DC-193 | 2.5 | 2.5 |
| Freon 11A | 38.5 | 38.5 |
| Mondur MR | 151.3 | 152.6 |
| NCO/OH Ratio | 2.0 | 2.0 |
| Reaction Profile (Min:Sec) | | |
| Cream Time | 0:24 | 0:19 |
| Gel Time | 0:50 | 0:34 |
| Tack Free Time | 1:23 | 0:53 |
| Density (PCF) | 2.09 | 2.07 |
| Humid Aging, 158° F./100% RH, % change in volume | | |
| 1 day | 16.77 | 6.99 |
| 7 days | 18.27 | 8.54 |
| Dry Aging, 200° F./ambient RH, % change in volume | | |
| 1 day | 3.84 | 3.44 |
| 7 days | 6.72 | 5.73 |
| % Closed Cells | 92.7 | 92.7 |
| % Friability | 1.1 | 0.1 |

TABLE 4

| | Example 12 | Example 13 | Example 14 |
|---|---|---|---|
| Armol 101B-1 | 10 | — | — |
| Armol 101B-2 | — | 10 | — |
| Armol 201B-125 | — | — | 10 |
| Terate 203 | 45 | 45 | 45 |
| Voranol 575 | 45 | 45 | 45 |
| DC-193 | 2.5 | 2.5 | 2.5 |
| T-45 | 0.5 | 0.5 | 0.5 |
| Freon 11A | 50.5 | 48 | 48 |
| One Week Stability | YES | YES | YES |

TABLE 5

| | Example 16 | Example 17 |
|---|---|---|
| Armol 101B-1 | — | 15.0 |
| Armol 201B-135 | 10.0 | — |
| Terate 203 | 45.0 | 67.5 |
| Voranol 575 | 45.0 | 17.5 |
| T-45 | 0.5 | 0.5 |
| DC-193 | 2.5 | 2.5 |
| Freon 11A | 57 | 60.0 |
| Mondur MR | 275 | 293.6 |
| NCO/OH Ratio | 2.50 | 3.0 |
| Reaction Profile (Min:Sec) | | |
| Cream Time | 0:36 | 0:17 |
| Gel Time | 1:13 | 0:21 |
| Tack Free Time | 1:48 | 0:25 |
| Density (PCF) | 1.78 | 1.94 |
| Humid Aging, 158° F./100% RH, % change in volume | | |
| 1 day | 5.1 | 4.9 |
| 7 days | 4.9 | 5.7 |
| Dry Aging, 200° F./ambient RH, % change in volume | | |
| 1 day | 1.2 | 2.7 |
| 7 days | 1.5 | 3.7 |
| % Closed Cells | 85.0 | 90.7 |
| % Friability | 5.2 | 1.7 |

What is claimed is:

1. A method for the manufacture of urethane-modified polyisocyanurate foams, comprising blending an isocyanate with a "B" side, said "B" side comprising a polyol blend, a surfactant, a blowing agent, and a catalyst, said polyol blend comprising:

(a) at least 5% (wt.) of a mixture of a polyalkoxylated amine and a polyalkoxylated quaternary ammonium borate ester, the weight ratio of said polyalkoxylated amine to said polyalkoxylated quaternary ammonium borate ester being between 1:0.15 and 1:12.0;

(b) at least 40% (wt.) of a resin polyol, said resin polyol comprising at least 70% (wt.) of a combination of polymers and monomers having the general formula:

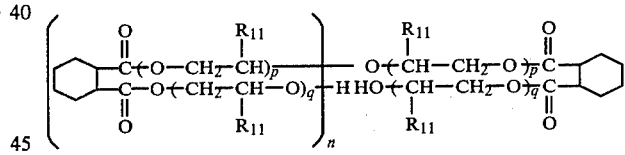

wherein n is between 0 and 50, $R_{11}$ is either H— or $CH_3$—, and p and q are each integers between 1 and 10; and (c) the remainder of said polyol blend being a polyether or polyester polyol.

2. The method as set forth in claim 1, wherein said polyalkoxylated amine is selected from the group consisting of

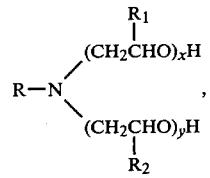

wherein R is selected from the group of alkyl radicals having between 1 and 18 carbon atoms, x and y are integers each having a value of at least one and wherein the sum of x and y does not exceed 50 and wherein $R_1$ and $R_2$ may be the same or different and may be selected from the groups consisting of H—, CH$_3$—, C$_1$-C$_{10}$ straight- or branched-chain alkyl or alkenyl radicals, a phenyl group, a benzyl group or halogenated alkyl group.

3. The method as set forth in claim 2, wherein R is the tallow alkyl group, R$_1$ and R$_2$ are each H—, and wherein x plus y equal 5.

4. The method as set forth in claim 1, wherein said polyalkoxylated quaternary ammonium borate ester is of the general formula:

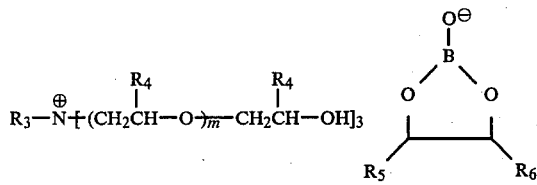 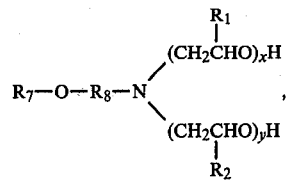

wherein R$_3$ is a straight- or branched-chain alkyl or alkenyl radical having from 1 to 30 carbon atoms, inclusive, or a phenyl or benzyl radical; R$_4$ is H—, a C$_1$ to C$_{10}$ straight- or branched-chain alkyl or alkenyl radical, a phenyl group, a benzyl group, or a halogenated alkyl group; R$_5$ and R$_6$ are different or the same and are selected from the group including H—, or a C$_1$ to C$_{10}$ straight- or branched-chain alkyl or alkenyl radical, a phenyl group, or a benzyl group, and wherein m is an integer between 0 to 30, inclusive.

5. The compound as set forth in claim 4, wherein R$_3$ is a straight- or branched-chain alkyl or alkenyl radical having from 8 to 18 carbon atoms, and R$_4$ is H—.

6. The compound as set forth in claim 4, wherein R$_5$ and R$_6$ are H—.

7. The compound as set forth in claim 4, wherein R$_5$ is H— and R$_6$ is CH$_3$—.

8. The compound as set forth in claim 6, wherein m is 0.

9. The compound as set forth in claim 7, wherein m is 0.

10. The compound as set forth in claim 8, wherein R$_3$ is C$_{18}$H$_{37}$—.

11. The method as set forth in claim 1, wherein said polyalkoxylated amine is selected from the group consisting of wherein R$_7$ is selected from the group of C$_1$-C$_{20}$ alkyl groups and R$_8$ is a C$_2$ to C$_5$ alkyl group; R$_1$ and R$_2$ are the same or different and may be selected from the groups consisting of H—, CH$_3$—, C$_1$ to C$_{10}$ straight- or branched-chain alkyl or alkenyl radicals, a phenyl group, a benzyl group, or a halogenated alkyl group; and x and y are integers each having a value of at least 1 and a sum not exceeding 50.

12. The method as set forth in claim 1, wherein said polyalkoxylated quaternary ammonium borate ester is of the general formula:

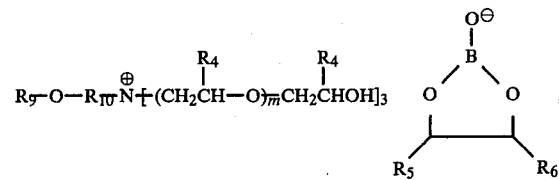

wherein R$_4$ is H—, a C$_1$ to C$_{10}$ straight- or branched-chain alkyl or alkenyl radical, a phenyl group, a benzyl group, or a halogenated alkyl group; R$_5$ and R$_6$ are different or the same and are selected from the group including H—, or a C$_1$ to C$_{10}$ straight- or branched-chain alkyl or alkenyl radical, a phenyl group, or a benzyl group, m is an integer between 0 and 30, inclusive, R$_9$ is a C$_1$-C$_{20}$ alkyl group, and R$_{10}$ is a C$_2$ to C$_5$ alkyl group.

* * * * *